United States Patent Office 3,374,213
Patented Mar. 19, 1968

3,374,213
POLYPROPYLENE POLYMERIZATION PROCESS
Donald F. Hoeg, Mount Prospect, Ill., assignor, by mesne assignments, to Rexall Drug and Chemical Company, Los Angeles, Calif., a corporation of Delaware
No Drawing. Filed Nov. 2, 1962, Ser. No. 235,122
3 Claims. (Cl. 260—88.2)

This invention relates to a novel process for polymerizing alfa-olefins. In particular it relates to a process for preparing an improved low temperature impact resistant polypropylene.

As heretofore known, propylene can be polymerized to a high molecular weight solid polymer by contacting propylene with a catalyst composition composed of a transition metal halide and a tri-alkyl aluminum compound. Typical methods of preparing polypropylene are disclosed in Belgian Patent 538,782 and U.S. Patents 2,949,447 and 2,911,384. Generally, such processes produce propylene polymers having a molecular weight of from about 50,000 to about 5,000,000 with a major portion of the polymer being crystalline in that it exhibits a crystalline structure by X-ray analysis and is insoluble in heptane. Crystalline polypropylene is well known in the art for its highly desirable properties such as high tensile strength, high modulus of elasticity and good resistance to elevated temperatures. However, in spite of these desirable physical properties crystalline polypropylene is known to have one particularly undesirable property in that it becomes quite brittle at low temperatures as described in U.S. Patent 3,018,263. Since many of the articles molded or formed from crystalline polypropylene are to be subjected to low temperatures, it is highly desirable that the properties of crystalline polypropylene be modified so that it will not fail when subjected to stress at the lower temperatures.

It is an object of the present invention, therefore, to provide a novel process for producing polypropylene of improved low temperature properties, particularly with a decreased brittle temperature. It is another object of this invention to provide a method whereby propylene is polymerized in the presence of a minor portion of ethylene to produce a true copolymer of propylene and ethylene. Other objects advantages and features of this invention will be apparent to those skilled in the art in view of the following detailed description of the invention.

Accordingly, in this invention it has been found that polypropylene of significantly decreased brittleness temperature is obtained by polymerizing propylene with a sterospecific catalyst composition composed of titanium tri-chloride/tri-ethyl aluminum in the presence of a small amount of ethylene, i.e., 5 to 15 volume percent based on propylene. The temperature of the polymerization must be above 100° C. This temperature limitation is critical to the success of this process. Without a temperature in excess of 100° C., polypropylene of decreased brittle temperature cannot be produced. This improvement in the low temperature properties of polypropylene is obtained with little sacrifice in the other desirable properties. The resultant polymer may be molded into films, fibers, or other articles requiring a material with the highly desirable properties of polypropylene.

The polypropylene produced by the method of this invention have been determined to be a true copolymer of ethylene and propylene. This result is contrary to that reported by Natta (Australian Patent 224,752) wherein, although using a similar process, a homo-polymer was observed. The essential difference between the processes of this invention and that used by Natta is the temperature of reaction. In the process of Natta a low temperature, i.e., less than 80° C. was used. In the present invention the reaction temperature must be greater than 100° C. The explanation of the contrary result is not clearly known, but it is believed that the higher temperature of reaction decreased the selectivity of the site of polymerization for one monomer over the other, thereby producing copolymerization.

In the process of this invention, the polymers are prepared by polymerizing the propylene-catalyst system with the aid of a stero-specific catalyst. The catalyst is a solid, insoluble, reaction product obtained by partially reducing titanium tetra-chloride with a metallic aluminum. The preferred catalyst of this type is a conventional commercial product and is usually prepared by reducing one mole of titanium tetra-chloride with about one third mole of aluminum to give a material corresponding to $TiCl_3:AlCl_3$ mole ratio of about 3:1. The product is then activated with an aluminum alkyl such as tri-ethyl aluminum.

The ratio of catalyst:monomer used in the process of this invention is not critical. Catalyst:monomer weight ratios in the range of 1,000:1 are acceptable.

EXAMPLE I

Preparation of feed streams

The comonomer feed streams were prepared in a large cylinder (35-pound propylene cylinder), the cylinder first being evacuated. Ethylene is first admitted to the cylinder to a predetermined pressure (dependent upon the percent ethylene desired in the feed stream) followed by propylene to a total pressure of about 110 pounds, which is well below the critical pressure of propylene at room temperature. This insures a single gas phase being present. Analysis of the composition of the feed stream was made on a Perkin-Elmer fractometer.

The specific procedure used was to fill a small transfer cylinder with ethylene to a specific pressure (for example 500 p.s.i. as in run #4). This was then transferred to the large comonomer tank, the pressure of which was 100 p.s.i. prior to this addition. After the addition of the ethylene, the tank pressure was 104 p.s.i. The tank was then pressured to 110 p.s.i. by the addition of propylene.

EXAMPLE II

Polymerization of propylene

The polymerization of propylene was carried out in a standard one liter, stainless steel, stirred reactor. 0.505 gram of powdered catalyst ($TiCl_3$) was transferred to the reactor under a nitrogen blanket. 400 ml. of cyclohexane was subsequently weighed in. This system was then heated to the approximate reaction temperature (110 to 115° C.) and the tri-ethyl aluminum (0.374 gram=1.28 cc. TEA solution in cyclohexane) was blown into the reactor with nitrogen. The ethylene-propylene feed mixture of Example I was then fed to the reactor. The comonomer feed was allowed to flow into the reactor on a demand basis. After 1 hour, the reaction was stopped and the polymers were purified in the conventional manner with isopropanol followed by further washing and drying. Yield 60 grams. After drying, the polymers were thoroughly wetted with a solution of methylene chloride and 0.2 weight percent (based on polymer) each of "Santonox" and dilauryl thiodipropionate were added to the polymer. Films were pressed and specimens cut with a standard die for Scott Tester evaluation of brittleness. The brittle point measurements are recorded in Table I below.

TABLE I.—BRITTLE POINT MEASUREMENTS ON SCOTT TESTER [1]

| Sample No. | Vol. Percent Ethylene in Feed | Temperatures (° C.) | | | | | | | | | | | | | | | | |
|---|---|---|---|---|---|---|---|---|---|---|---|---|---|---|---|---|---|---|
| | | −12 | −10 | −8 | −6 | −5 | −3 | −1 | +4 | +6 | +8 | +9 | +10.5 | +11 | +13 | +15 | +17 | +19.5 | +22 |
| 1 | 0 | F | F | F | F | F | F | F | F | F | F | F | F | F | F | F | F | P | P |
| 2 | 0.6 | F | F | F | F | F | F | F | F | F | F | F | P | P | P | P | P | P | P |
| 3 | 6.7 | F | P | P | F | P | P | P | P | P | | | | | | | | | |
| 4 | 10.8 | F | F | F | P | P | P | P | | | | | | | | | | | |
| 5 | 13.7 | P | P | P | P | P | P | P | | | | | | | | | | | |

[1] ASTM designation D746-57T.

In the above table, the symbol "F" indicates that the sample failed the brittleness test, whereas "P" indicates that the sample passed the test.

It is clear that a substantial reduction in the brittle point is obtained by copolymerization of propylene with a small amount of ethylene. In order to determine qualitatively the effect of copolymerization upon the high temperature properties, the melting point of the specimens was measured. Tensile data on the specimens was also obtained. The results are shown in Table II.

TABLE II.—SUMMARY OF PROPERTY DATA ON PROPYLENE—ETHYLENE COPOLYMERS

| Sample No. | Vol. percent Ethylene in Feed | Brittle Point Observed, ° C.[1] | First Instance of Melting, ° C.[2] | Tensile Strength, P.s.i.[3] | Modulus of Rigidity, P.s.i. (tangent) | Percent Elongation at Yield Point |
|---|---|---|---|---|---|---|
| 1 | 0 | 20-21 | 155-156 | 3,634 | 97,513 | 20.2 |
| 2 | 0.6 | 9 | 148-154 | 3,644 | 83,213 | 23.5 |
| 3 | 6.7 | −5 | | 3,128 | 35,637 | 29.6 |
| 4 | 10.8 | −6 | 142-146 | 2,720 | 46,625 | 30.2 |
| 5 | 13.7 | [4] −12 | 128-134 | 1,330 | 16,662 | 43.2 |

[1] Scott Tester measurements summarized from Table I.
[2] Visual observation of melting point range.
[3] ASTM designation D638-60T.
[4] Sample was not brittle down to −12° C. No data were obtained below this temperature.

It is apparent from Table II that there is a decrease in the tensile strength of the polypropylene and also in the melting point, with the increase in the percentage of ethylene which copolymerized. However, it is also observed that there is a significant decrease in the brittle point temperature. Thus, even though some of the high temperature properties are decreased by the copolymerization with ethylene, these changes can be relatively small by controlling the percentage of ethylene while a significant decrease in the brittle point can be obtained. Table II indicates that the best results are obtained when the percentage of ethylene is maintained between approximately 5 and 10 percent based on the propylene.

In order to determine that a true copolymer had been produced. Solubility, crystallinity X-ray, and infrared spectra tests were run on samples 1, 2, 4, and 5. The results are shown in Table III.

TABLE III

| Sample No. | Vol. Percent Ethylene in Feed | Percent N-heptane Insoluble[1] | Intrinsic Viscosity Crude | Percent Crystallinity[2] | Infrared Spectral, cm.−1 |
|---|---|---|---|---|---|
| 1 | 0 | 75 | 3.5-3.7 | 65 | 734 |
| 2 | 0.6 | 68 | 3.0-3.0 | 60 | |
| 4 | 10.8 | 47 | 2.3-1.5 | 57 | 734 |
| 5 | 13.7 | 9 | 1.4-1.4 | 50 | 734 |

[1] The polymer is extracted with boiling heptane.
[2] Measured by X-ray diffraction.

Table III shows that the infrared spectra tests run on the various samples indicate absorption bands at 734 cm.−1 which is assigned to $(CH_2)_x$ where $x$ is equal to or less than 3. The solubility data indicates that the percentage of the product which was insoluble in heptane decreased with the increase in percent of ethylene which was added. Since homopolymers of both isotactic propylene and ethylene of high molecular weights are insoluble in boiling heptane, this evidence indicates that the resultant product was a true copolymer of propylene with ethylene.

The copolymer produced by the process of this invention can be fabricated into useful articles in the same manner as with regular polypropylene. For example, the composition can be blow molded, injection molded, or extruded to form waste baskets, bottles, tubing, films and the like.

Many equivalent modifications will be apparent to those skilled in the art from the reading of the foregoing without a departure from the inventive concept.

I claim:

1. The process for polymerizing propylene so as to obtain a solid polymer product having decreased low temperature brittleness which comprises polymerizing the propylene feed with a stereo-specific catalyst system of titanium trichloride/triethyl aluminum, the titanium trichloride having the Formula 3 $TiCl_3 \cdot AlCl_3$ in the presence of from 5 to 15 volume percent of ethylene based on propylene at a temperature above 100° C.

2. The process of claim 1 in which the amount of ethylene is 10%.

3. The process of claim 1 in which the temperature is within the range of 110–115° C.

References Cited

UNITED STATES PATENTS 3,032,510  5/1962  Tornqvist et al. _____ 260—93.7

FOREIGN PATENTS 851,002  10/1960  Great Britain.
857,183  12/1960  Great Britain.

JOSEPH L. SCHOFER, *Primary Examiner.*

F. L. DENSON, M. B. KURTZMAN,
*Assistant Examiners.*